United States Patent [19]

Satomi et al.

[11] Patent Number: 5,573,140

[45] Date of Patent: Nov. 12, 1996

[54] METALLIC VACUUM DOUBLE-WALLED CONTAINER

[75] Inventors: Yasuhiko Satomi; Seiichi Itoh; Eiji Otsuka; Jun Yamaki; Takashi Kato, all of Tokyo, Japan

[73] Assignee: Nippon Sanso Corporation, Tokyo, Japan

[21] Appl. No.: 511,961

[22] Filed: Aug. 7, 1995

Related U.S. Application Data

[63] Continuation-in-part of Ser. No. 165,405, Dec. 10, 1993.

[30] Foreign Application Priority Data

Dec. 24, 1992 [JP] Japan ................................ 4-344927

[51] Int. Cl.$^6$ ..................................................... B65D 90/04

[52] U.S. Cl. ......................... 220/420; 220/413; 220/470; 220/660

[58] Field of Search ................................... 220/420, 421, 220/422, 408, 412, 413, 425, 470, 660

[56] References Cited

U.S. PATENT DOCUMENTS

| | | | |
|---|---|---|---|
| 3,514,006 | 5/1970 | Molnar | 220/422 |
| 4,184,605 | 1/1980 | Stewart et al. | 220/422 |

*Primary Examiner*—Joseph M. Moy
*Attorney, Agent, or Firm*—Hoffmann & Baron

[57] ABSTRACT

A metallic vacuum double-walled container is provided in which an inner container and outer container are both formed from a metal. From among the aforementioned, at least the outer container possesses a body which is formed by rolling a steel plate with a Vickers hardness of 250–600.

1 Claim, 5 Drawing Sheets

METALLIC VACUUM DOUBLE-WALLED CONTAINER

RELATED APPLICATIONS

This application is a continuation-in-part of application Ser. No. 08/165,405, filed on Dec. 10, 1993, the subject matter of the above-mentioned application which is specifically incorporated by reference herein.

BACKGROUND OF THE INVENTION

1. Field of the Invention

The present invention relates to a stainless steel vacuum double-walled container for use as a portable thermos bottle, pot, jar and the like.

2. Relevant Art

Vacuum double-walled containers manufactured from stainless steel require a sufficient mechanical strength to prevent exterior damage or deformation due to impacts sustained when dropped or acted on by an exterior force: in particular, containers for use as portable thermos bottles require an increased strength. The strength of the container is approximately proportional to the hardness of the stainless steel plate comprising the container. Consequently, by using a stainless steel with a sufficiently high strength, the thickness of the stainless steel plate material comprising the double-walled container can be reduced, and as a result it is possible to significantly decrease the overall weight of the stainless steel vacuum double-walled container.

With regard to increasing the strength of the stainless steel plate, a method exists in which the draft of the stainless steel component is increased, in order to increase the curing operation (work hardening), by performing refining and/or martensite transformation of the metallic crystal granules during the metal processing.

On the other hand, as a process for vacuum sealing a stainless steel vacuum double-walled container, vacuum sealing processes are known such as those stated in Japanese patent application, first publication No. Sho 59-103633, Japanese patent application, first publication No. Sho 61-106119, or Japanese patent application, first publication No. Sho 58-192516 in which pressure welding and sealing of a chip tube is performed after creating a predetermined degree of vacuum by discharging the air via a chip tube arranged in the outer container at a temperature of 400° C.~1200° C. under vacuum or atmospheric air conditions, or in which vacuum sealing is carried out by heat processing and then melting a solid brazing material.

However, according to a conventional method for manufacturing a stainless steel vacuum double-walled container, a container is formed by processing a cold-rolled steel plate, e.g. a stainless steel plate with a surface finish such as a No. 2B material according to the JIS standard, by means of rolling, drawing, welding or a similar process. The hardness therein is determined by work processing in this manner, and consequently it is not possible to reduce the plate thickness below the minimum plate thickness required for each respective process.

Furthermore, there are also times when the stainless steel of double-walled containers, which are work hardened by means of heat processing during vacuum sealing, reduce the hardness as a result of annealing. In other words, stainless steel imparted with a high hardness from work hardening is softened when annealed at a temperature of 600° C. or greater. In addition, at a temperature of 600°~800° C., the solid solution carbon precipitates out as a carbide resulting in sensitization, easily occurrence of intergranular corrosion, and reduction of the corrosion resistance. Furthermore, the hardness is further reduced when the carbide is transformed into a solid solution by heating at a temperature of 1000°~1200° C. and returned to an austenite structure. The application of heat during vacuum discharge is important in order to sufficiently discharge the residue gas component in the stainless steel and create a high vacuum. This application of heat requires a temperature at least that of practical use: e.g. in the case of a thermos bottle, a temperature of 100° C. or greater is required in order to store the boiling water. From the aforementioned, in the manufacturing of a lightweight, vacuum double-walled container it is necessary to increase the hardness of the stainless steel material to be used, take into consideration the corrosion resistance according to heat processing, and select conditions which will prevent softening of the stainless steel.

SUMMARY OF THE INVENTION

It is an object of the present invention to provide a stainless steel vacuum double-walled container possessing a light weight and superior impact strength by means of increasing the work hardening of a stainless steel plate.

According to the present invention, in a vacuum double-walled container comprising a double-walled structure formed by joining the mouth portions of an inner container and an outer container manufactured respectively from a metal, and a vacuum insulation layer formed in the space between the aforementioned inner and outer containers, a metal vacuum double-walled container is characterized in that the body therein formed by rolling at least the outer container is formed from a steel plate having a Vickers hardness of 250~600, cold worked at a cold working ratio of 10~50%.

The cold working ratio is the value calculated by the following equation $$\text{cold working ratio } (\%) = \frac{T1 - T2}{T1}$$

in which the decrease in thickness of the steel plate is shown by comparing the thickness of the steel plate before cold working (T1) with the thickness of the steel plate after working (T2).

In accordance with the present invention, it is possible to adjust the hardness of the stainless steel plate forming the container. By increasing this hardness it is possible to obtain a hardness that is able to withstand impact from exterior forces even when possessing a plate thickness thinner than conventional products. In this manner, the formation of a metal vacuum double-walled container possessing a lighter weight than that of conventional products is possible.

In addition, since it is possible to reduce the plate thickness of the container, the materials cost can be considerably curtailed, thus resulting in the production of an economical product.

Furthermore, in the case of a plate thickness similar to that of conventional products, a product can be manufactured with an superior strength due to the high hardness of the stainless steel plate.

DETAILED DESCRIPTION OF THE PREFERRED EMBODIMENTS

Figure 1:
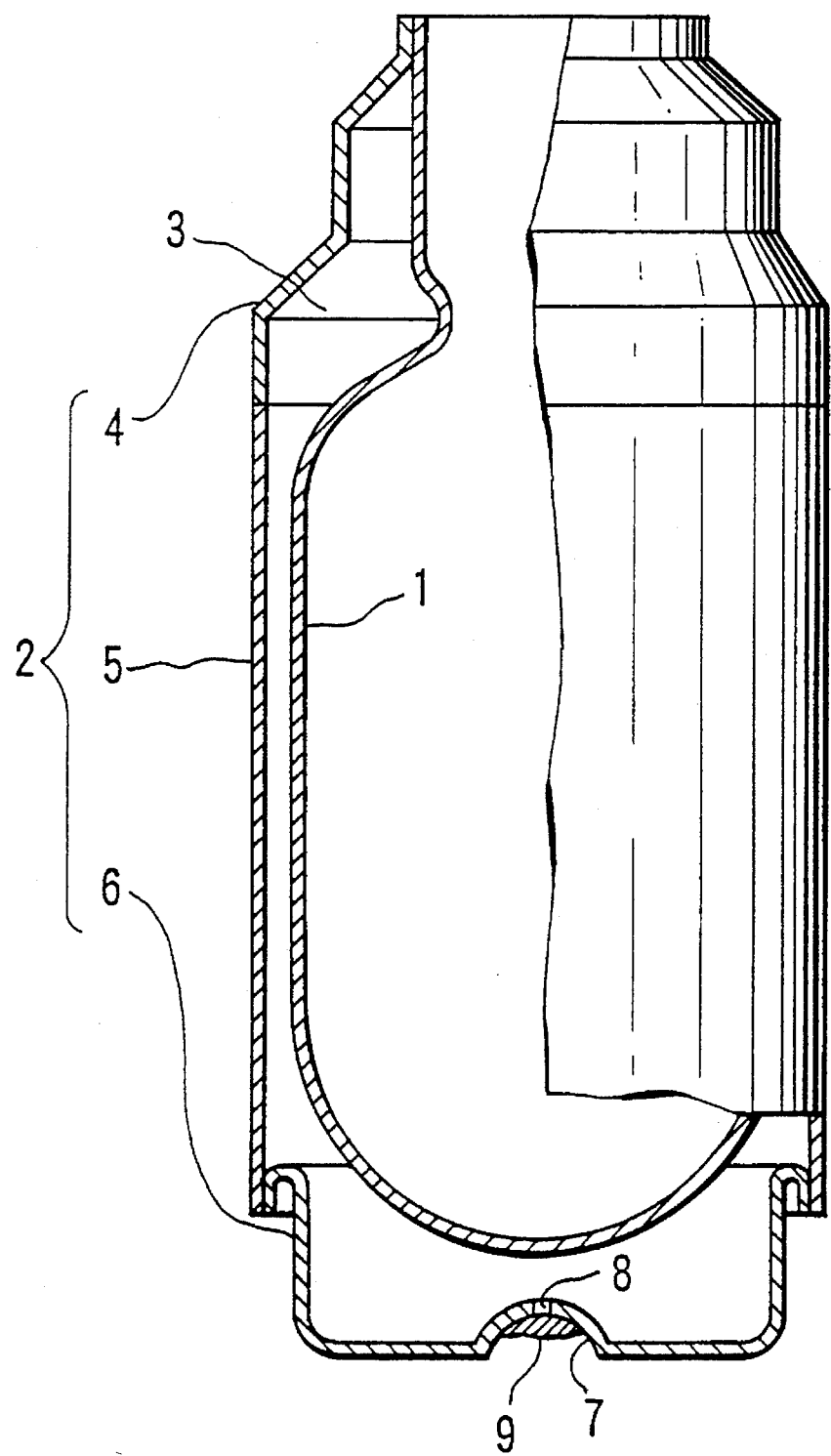
FIG. 1 shows a frontal cross-sectional view of a stainless steel thermos bottle according to an embodiment of a metal vacuum double-walled container of the present invention.

FIG. 1 shows a frontal cross-sectional view of a stainless steel thermos bottle according to an embodiment of a metal vacuum double-walled container of the present invention. This thermos bottle is constructed from an inner container 1 and an outer container 2 both formed from a stainless steel material and are joined at their mouth portions respectively: this thermos bottle further comprises a vacuum insulation layer 3 formed in the space in between inner container 1 and outer container 2. The aforementioned outer container 2 is constructed by joining an upper member 4, body 5 and bottom member 6 by means of welding and thereby forming an integrated body. In addition, a concave portion 7 is provided at approximately the center of bottom member 6, while an exhaust aperture 8 is formed at the approximate center of this concave portion 7. This exhaust aperture 8 is sealed by means of a stopper 9 formed from a metal-like brazing material which melts upon heating to a specified temperature at the time of performing a vacuum exhaust treatment.

This thermos bottle manufactured from stainless steel is formed by previously rolling and adjusting the steel plate to form at least the outer container 2 to a Vickers hardness in the range of 250~600, and then performing an vacuum exhaust treatment under a temperature of 200°~600° C. on the double-walled container, formed by joining together inner container 1 and outer container 2 into an integrated body. The vacuum is then maintained in the space between the walls of the double-walled container, and the container is sealed. Subsequently, by allowing the container to stand and cool to room temperature, the stainless steel undergoes low-temperature annealing, resulting in a structure in which the super-hardened portion has a decreased plate thickness.

In manufacturing this thermos bottle, a stainless steel plate which has been previously adjusted to a Vickers hardness (Hv) in the range of 250~600 by rolling is used to form the double-walled container by means of processes such as rolling, drawing, bulging, welding and the like. The container mouth portion is then pointed downward, stopper 9 is inserted into concave portion 7, and the container is placed into a vacuum heating furnace. A predetermined vacuum is subsequently created in the space between inner container 1 and outer container 2 at a temperature of 200°~600° C. by means of this vacuum exhaust treatment, and exhaust aperture 8 of the container is then sealed by means of melting stopper 9. The steel plate then undergoes low-temperature annealing thereby resulting in an increase in the hardness of the stainless steel plate to form the resultant container.

In this manner, a metallic double-walled container is produced in which an inner container and outer container, formed by plastic working of the stainless steel plate previously adjusted to a Vickers hardness in the range of 250~600 by rolling, are joined to form an integrated body. Subsequently, after this metallic double-walled container undergoes a vacuum exhaust treatment at a temperature of 200°~600° C., low-temperature annealing is performed by allowing the container to cool to room temperature. In order to prove that the stainless steel plate forming the container constructed in the aforementioned manner can actually be super-hardened, the following experiment was carried out.

Figure 2:
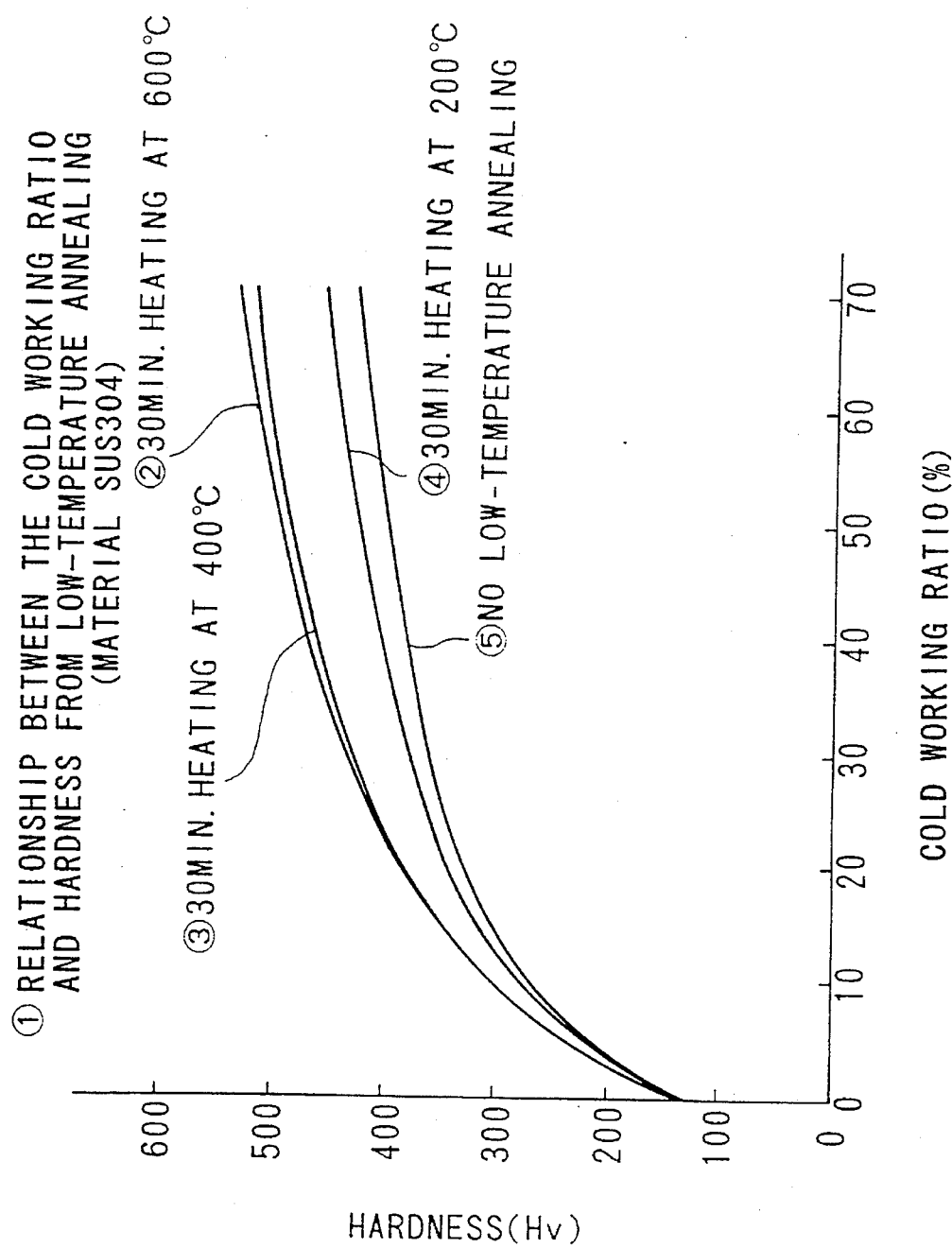
FIG. 2 is a graph showing the relationship between the cold working ratio and hardness with regard to low-temperature annealing of a stainless steel plate.

Namely, various types of steel plates were made by cold working stainless steel plates (SUS 304) to a cold working ratio in the range of 0~70%, and the Vickers hardness of each stainless steel plate was measured. In addition, the aforementioned stainless steel plates were put through low-temperature annealing for 30 minutes each at 200° C., 400° C. and 600° C. respectively, following which measurements of the Vickers hardness were again performed. The relationship between the cold working ratio and hardness according to the low-temperature annealing was then examined. These results are shown in FIG. 2.

In addition, the increase in hardness with regard to differences in the cold working ratio and annealing temperature of the same stainless steel plate (SUS 304) are shown in Table 1.

Experimental Method: Test members of thickness 0.5 mm, with 5 cm sides were cold worked to predetermined cold working ratio. After cold working, each test member was placed in a heating furnace at normal temperature, and the temperature of the furnace was raised to the above specified temperatures which were respectively maintained for 30 minutes. Subsequently, the Vickers hardness was measured after removing the test member from the furnace.

TABLE 1

| Cold working ratio (%) | Hardness (Hv) | | | |
| --- | --- | --- | --- | --- |
| | Without Annealing | 200° C. (Increased Hv) | 400° C. (Increased Hv) | 600° C. (Increased Hv) |
| 10 | 266 | 277 (11) | 303 (37) | 300 (34) |
| 20 | 326 | 342 (16) | 382 (56) | 385 (59) |
| 30 | 360 | 378 (18) | 426 (66) | 433 (73) |
| 50 | 395 | 418 (23) | 483 (88) | 490 (95) |

As seen from FIG. 2 and Table 1, Hv is increased by means of increasing the cold working ratio of the stainless steel plate. Additionally, it was discovered that the Hv is further increased when carrying out low-temperature annealing after heat processing at a temperature in the range of 200°~600° C. and returning the cold worked stainless steel plate to room temperature. Consequently, in order to increase the hardness, pressure rolling of the stainless steel plate to serve as the double-walled container material is previously carried out when the steel plate is in a raw material state. A double-walled container is then formed by carrying out processes such as rolling, bulging, drawing, welding and the like, and a vacuum is created in the space between the walls by means of a vacuum exhaust treatment while heating under a temperature of 200°~600° C. After sealing the vacuum, low-temperature annealing is performed upon returning the container to room temperature, thereby resulting in an increase in the hardness of the stainless steel plate. Consequently, the thickness of the stainless steel vacuum double-walled container is reduced, and a reduction in the weight of the container becomes possible.

In the case when the Vickers hardness of the raw material stainless steel plate is less than 250, a sufficiently high hardness is unobtainable for the final product, and reduction of the thickness, and thereby weight of the plate material cannot be sufficiently achieved. In addition, in the case when the Hv is greater than 600, plastic working of the steel plate becomes difficult.

As well, when the temperature of the low-temperature annealing is less than 200° C., the increase in the hardness due to this low-temperature annealing is small, while on the other hand, when this temperature is greater than 600° C., problems arise such as a reduction of the hardness, degradation of the corrosion resistance, and the like.

Furthermore, in the aforementioned embodiment, a stainless steel thermos bottle was used as an example of a metallic vacuum double-walled container, however, it is needless to say that other metallic vacuum double-walled containers may also be applied according to the present invention. For example, the object shown in FIG. 3 in which a vacuum seal is obtained by means of pressure welding chip tube 10, the stainless steel jar for use in lunch boxes shown in FIG. 5, various types of stainless steel cups, vacuum insulated cooking containers, and the like may also be employed as the stainless steel thermos bottle mentioned above.

MANUFACTURING EXAMPLE 1

The outer container 2 of the portable thermos bottle shown in FIG. 2, was formed by welding the upper member 4, bottom member 6, both of which were formed by drawing from stainless steel plates, and the body 5, which was formed by rolling from a steel plate, into a single integrated unit. The outer container 2 and the inner container 1 were joined at their mouth portions producing a single integrated double-walled container. Next, this double-walled vessel was put in a vacuum heating furnace and heated to 500° C. while evacuation took place, the stopper 7, formed from a metal-like brazing material, provided around the exhaust aperture was melted closing the exhaust aperture and vacuum sealing the space in between the inner container and outer container, thereby producing the container.

Example 1 of the Present Invention

The body 5 of the outer container was produced using stainless steel plate of SUS304 having a hardness of 320 Hv, and which was obtained by cold rolling in such a way as to give a cold-working ratio of 20%.

Comparative Example 1

The body of the outer container was produced using stainless steel plate which was not cold worked (cold-working ratio of 0%) and had a hardness of 150 Hv.

The body of Comparative Example 1 required a thickness of 0.5 mm, giving it a weight of 310 g, to meet the strength requirements for the outer container of a thermos bottle. In addition, the weight of the thermos bottle of Comparative Example 1, constructed using this outer body was 570 g.

In contrast, in order to meet the strength requirements for the outer container of a thermos bottle in Example 1, it was possible to make the body with a thickness of 0.25 mm, giving it a weight of 190 g. In addition, the weight of the thermos bottle of Example 1, constructed using this outer body was 450 g.

MANUFACTURING EXAMPLE 2

Figure 3:
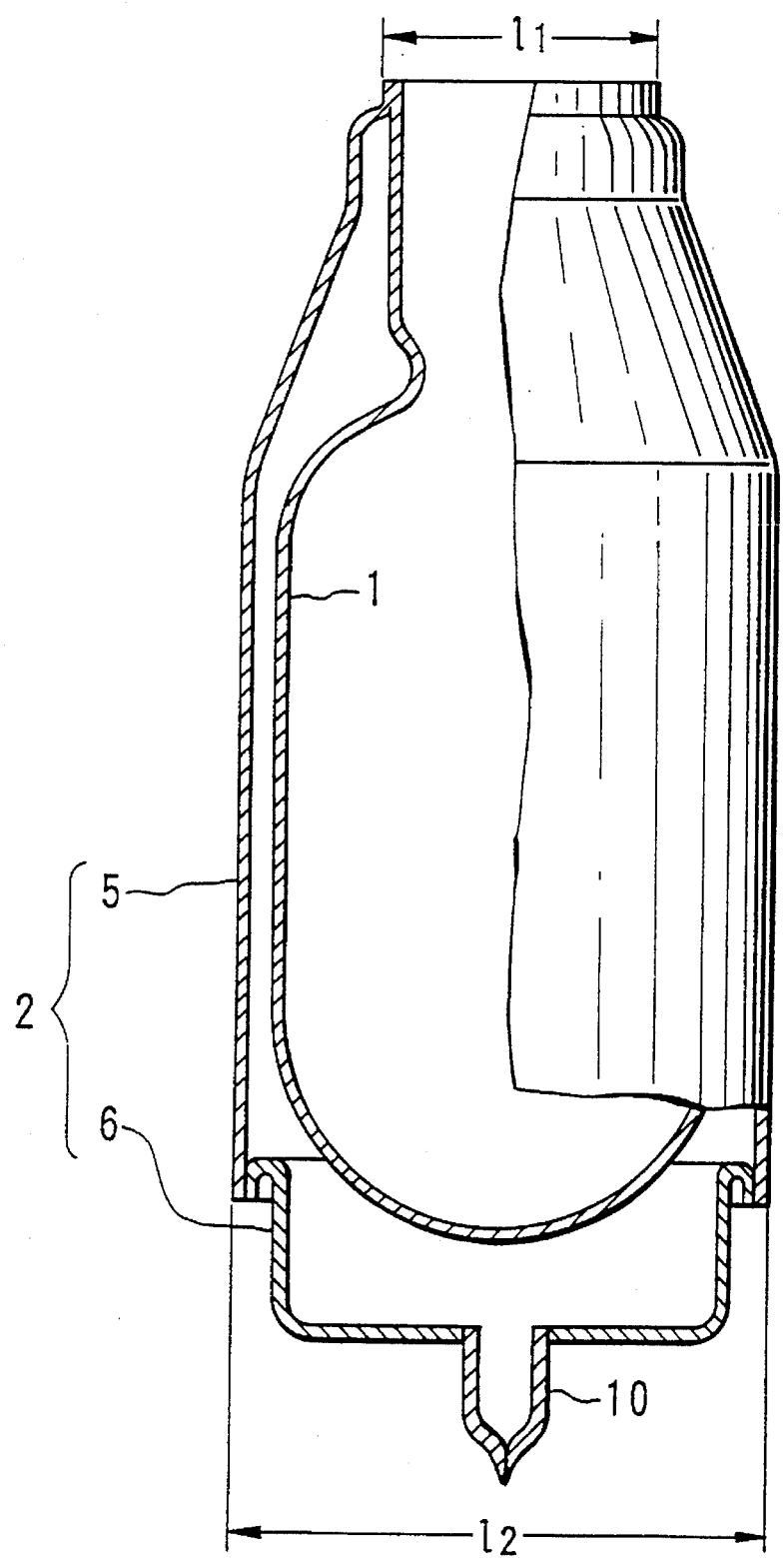
FIG. 3 shows a frontal cross-sectional view of a stainless steel thermos bottle according to a second embodiment of a metal vacuum double-walled container of the present invention.
Figure 4:
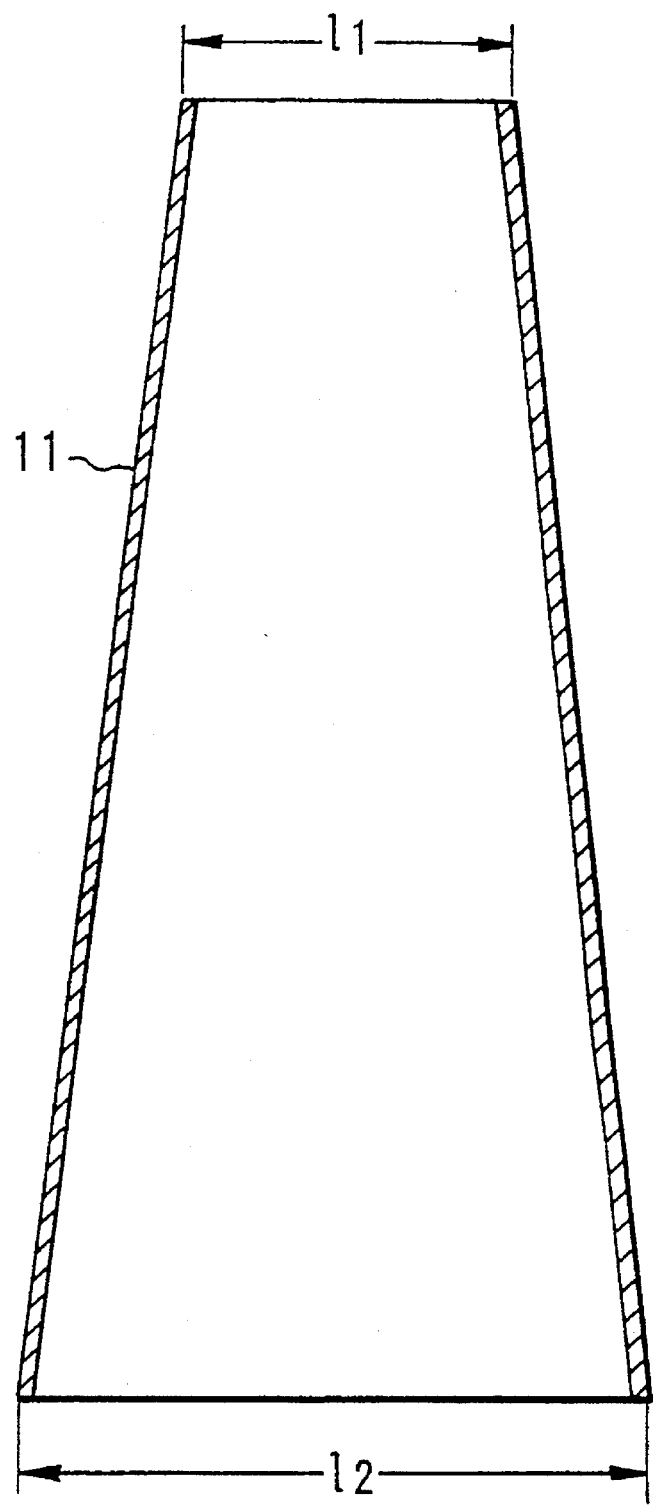
FIG. 4 shows a frontal cross-sectional view of a tapered tube used in the manufacturing of structural members of the same thermos bottle.

FIG. 3 shows a portable thermos bottle. The body 5 was produced by pressing or bulging the tapered pipe 11 shown in FIG. 4, which was formed from stainless steel plate. The bottom member 6 was formed from stainless steel plate by drawing. The outer container 2 of the portable thermos bottle of FIG. 3 was formed by welding the body 5 and the bottom member 6 at their respective mouth portions into an integrated double-walled container. Next, this double-walled container was put into a vacuum heating furnace and while a vacuum exhaust treatment was performed at a temperature of 450° C. in atmospheric air, the air in the space between the outer container 2 and the inner container 1 was evacuated through copper pipe 10. After this, the pipe 10 was pressure sealed, thereby producing the product.

Example 2 of the Present Invention

Body 5 of the outer container was made using stainless steel plate made from ½ H-shaped refined and rolled material of SUS304 (cold working ratio of 10%, and hardness of 280 Hv).

Comparative Example 2

A body was made using stainless steel plate of SUS304 having a hardness of 150 Hv and which had not been refined and rolled (cold working ratio of 0%).

The body of Comparative Example 2 required a thickness of 0.4 mm, giving it a weight of 180 g, to meet the strength requirements for the outer container of a thermos bottle. In addition, the weight of the thermos bottle of Comparative Example 2 constructed using this outer body was 380 g.

In contrast, in order to meet the strength requirements for the outer container of a thermos bottle in Example 2, it was possible to make the body with a thickness of 0.2 mm, giving it a weight of 90 g. In addition, the weight of the thermos bottle of Example 2, constructed using this outer body was 290 g.

MANUFACTURING EXAMPLE 3

Figure 5:
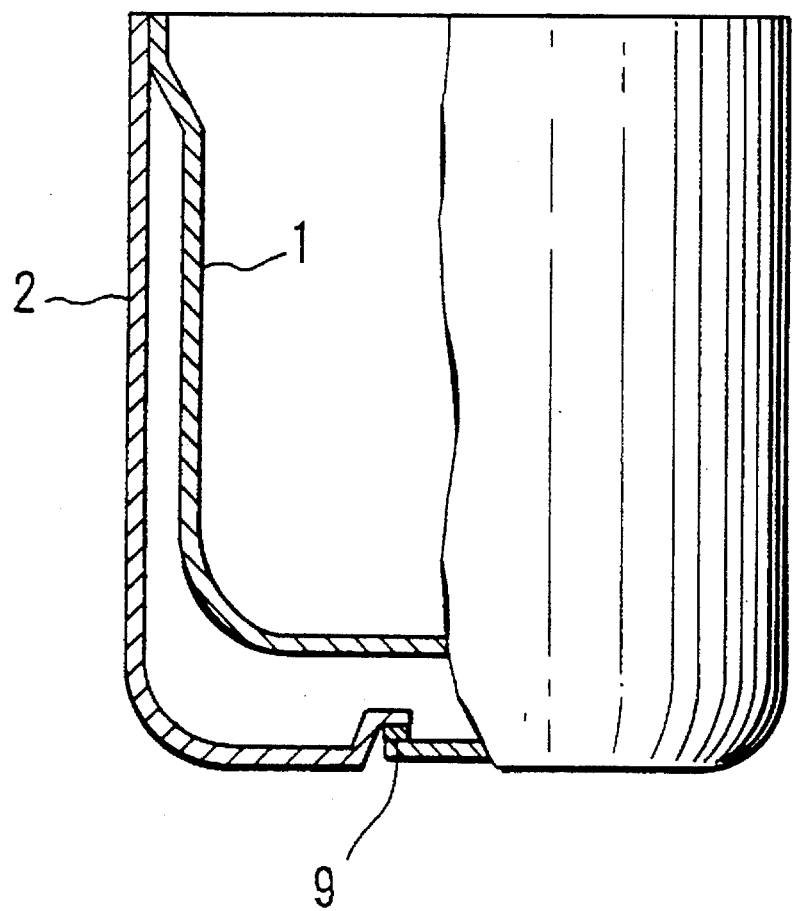
FIG. 5 shows a frontal cross-sectional view of jar for use as a stainless steel valve body according to an embodiment of a metal vacuum double-walled container of the present invention.

The outer container 2 of the jar for use as a lunch box of FIG. 5 was formed by drawing from a stainless steel plate. The outer body 2 and the inner body 1 were joined by welding at their mouth portions forming an integrated double-walled container. Next, this double-walled container was put into a vacuum heating furnace and while evacuation took place at a temperature of about 300° C., the stopper, which was formed from a metallic brazing material, provided around the exhaust aperture melted and sealed the exhaust aperture, vacuum sealing the space between the outer container 2 and the inner container 1, forming the product.

Example 3 of the Present Invention

Outer body 2 was produced using stainless steel plate having a hardness of 320 Hv and formed by processing at a cold working ratio of 20% from stainless steel of SUS301.

Comparative Example 3

The outer container was produced from steel plate of SUS301 (hardness 200 Hv) which had not been cold worked.

The outer container of Comparative Example 3 required a thickness of 0.4 mm giving it a weight of 360 g, to meet the strength requirements for the outer container of a jar. In addition, the weight of the jar of Comparative Example 3, constructed using this outer body was 580 g.

In contrast, in order to meet the strength requirements for the outer container of a jar in Example 3, it was possible to make the body with a thickness of 0.2 mm, giving it a weight of 180 g. In addition, the weight of the jar of Example 1, constructed using this outer body was 400 g.

SUPPLEMENTARY EXAMINATION

Parts formed by drawing from stainless steel plate of SUS304 which had been rolled at a 20% cold working ratio and had a hardness of 330 Hv was heat treated at 700° C. Parts heat treated at 700° C. have few increases in hardness due to the heat treatment when compared with parts heat treated at 200°–600° C.

in addition, production of body 5 using steel plate of SUS304 having a hardness of 600 Hv or greater rolled at a cold rolling ratio of greater than 50% was attempted, but the plastic working of the steel plate was difficult.

Furthermore, stainless steel plates using stainless steel other than SUS304, such as SUS301, SUS201, SUS316, with increasing hardness ratios depending on the cold working ratio and the annealing temperature were examined. It was confirmed that, as with SUS304, the hardness of rolled steel plate heat treated (annealed) under temperature conditions in the range of 200°–600° C. can be increased according to increases in the cold working ratio.

What is claimed is:

1. A vacuum double-walled container comprising an outer container of austenitic stainless steel and a metallic inner container that are joined at their respective mouth portions to form an integrated double-walled structure having a vacuum insulation layer between said outer container and said inner container, wherein said austenitic stainless steel of said outer container has been cold worked at a cold working ratio of 10–50% to a Vickers hardness of 250–600 Hv, heated to a temperature between 200°–600° C. and allowed to cool to room temperature, to provide said outer container with increased mechanical strength in comparison to an outer container of similar thickness formed from untreated austenitic stainless steel.

* * * * *